(12) United States Patent
Morello et al.

(10) Patent No.: US 11,670,923 B2
(45) Date of Patent: *Jun. 6, 2023

(54) RIBBED EXTRUDED ELECTRICAL CONDUIT

(71) Applicant: Hydro Extrusion USA, LLC, Rosemont, IL (US)

(72) Inventors: Carmen Morello, Rosemont, IL (US); Ralph Westphal, Rosemont, IL (US)

(73) Assignee: HYDRO EXTRUSION USA, LLC, Rosemont, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,818

(22) Filed: Apr. 13, 2022

(65) Prior Publication Data

US 2022/0239081 A1 Jul. 28, 2022

Related U.S. Application Data

(63) Continuation of application No. 16/862,012, filed on Apr. 29, 2020, now Pat. No. 11,322,920.

(60) Provisional application No. 62/842,823, filed on May 3, 2019.

(51) Int. Cl.
  *H02G 3/04* (2006.01)
(52) U.S. Cl.
  CPC ......... *H02G 3/0487* (2013.01); *H02G 3/0406* (2013.01)
(58) Field of Classification Search
  None
  See application file for complete search history.

(56) References Cited

U.S. PATENT DOCUMENTS

| 1,785,403 A | 12/1930 | Babb |
| 3,356,790 A | 12/1967 | Polizzano |
| 3,428,741 A | 2/1969 | Zuch |
| 4,110,551 A | 8/1978 | Cookson |
| 4,141,623 A | 2/1979 | Dubost |
| 4,273,367 A | 6/1981 | Keeney |
| 4,545,427 A | 10/1985 | Alario |
| 4,585,034 A | 4/1986 | Hubbard |
| 4,729,409 A | 3/1988 | Paul |

(Continued)

FOREIGN PATENT DOCUMENTS

| DE | 2431903 | 1/1976 |
| GB | 739488 | 11/1955 |
| GB | 864421 | 4/1961 |

OTHER PUBLICATIONS

International Search Report and Written Opinion for App. No. PCT/US20/30469, dated Jul. 21, 2020, 14 pages.

(Continued)

*Primary Examiner* — Krystal Robinson
(74) *Attorney, Agent, or Firm* — Loeb & Loeb LLP

(57) ABSTRACT

An extruded aluminum conduit comprising a substantially cylindrical body including defining a conduit interior. The body may include an exterior surface defined by an outer diameter and an interior surface defined by an inner diameter. The conduit may include one or more protrusions protruding from the interior surface of the body toward the conduit interior and away from the exterior surface. The one or more protrusions may run substantially continuously from a first end of the body to a second end of the body.

20 Claims, 7 Drawing Sheets

(56) References Cited

U.S. PATENT DOCUMENTS

| | | | |
|---|---|---|---|
| 5,772,257 A | 6/1998 | Webb | |
| 6,161,587 A | 12/2000 | Durham | |
| 6,794,579 B1 | 9/2004 | Caracino | |
| 9,879,921 B2* | 1/2018 | Lee | F28F 1/32 |
| 9,891,009 B2* | 2/2018 | Lang | F28F 1/40 |
| 11,322,920 B2 | 5/2022 | Morello | |
| 2002/0014328 A1* | 2/2002 | Mitrovic | F28F 1/40 |
| | | | 165/183 |
| 2002/0159934 A1* | 10/2002 | Di Nicolantonio | B01J 8/062 |
| | | | 422/198 |
| 2005/0145380 A1 | 7/2005 | Usui | |
| 2007/0089868 A1* | 4/2007 | Houfuku | F28F 1/40 |
| | | | 165/184 |
| 2009/0294112 A1 | 12/2009 | Reifel | |
| 2011/0227333 A1 | 9/2011 | Stark | |
| 2014/0374134 A1 | 12/2014 | Itani | |
| 2017/0234024 A1 | 8/2017 | Hardie | |
| 2020/0350751 A1 | 11/2020 | Morello | |

OTHER PUBLICATIONS

Office Action (Notice of Allowance and Fees Due (PTOL-85)) dated Jan. 3, 2022 for U.S. Appl. No. 16/862,012 (pp. 1-9).

Office Action dated Mar. 16, 2021 for U.S. Appl. No. 16/862,012 (pp. 1-14).

Office Action dated Sep. 2, 2021 forU.S. Appl. No. 16/862,012 (pp. 1-19).

* cited by examiner

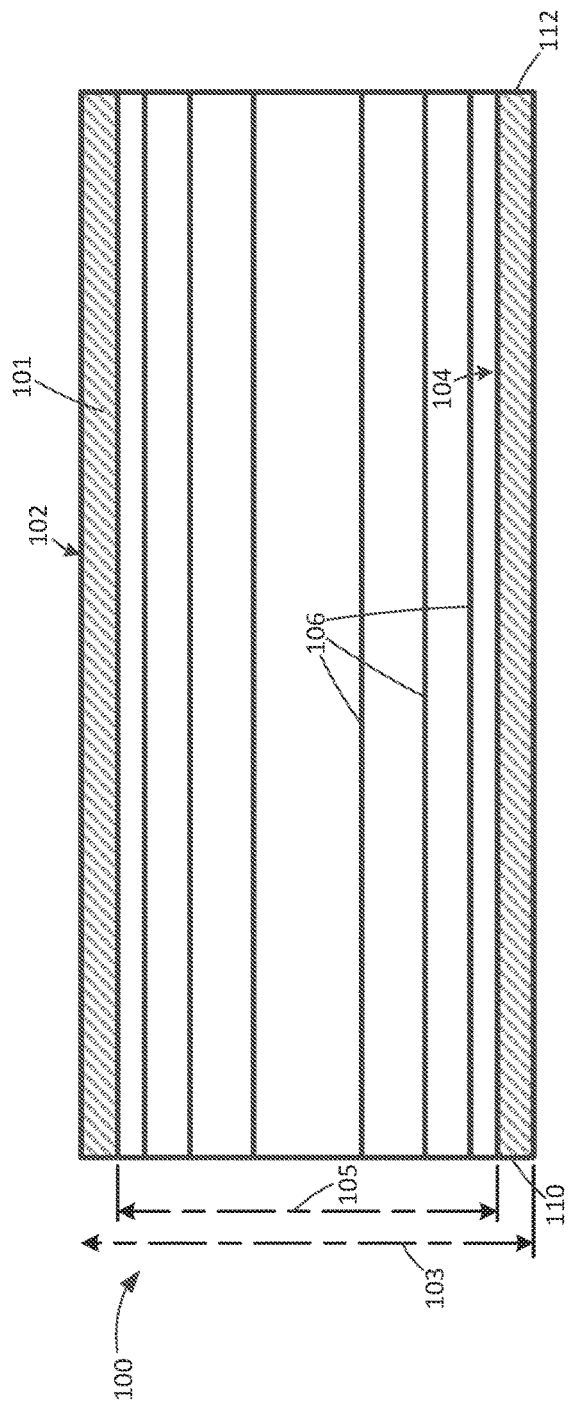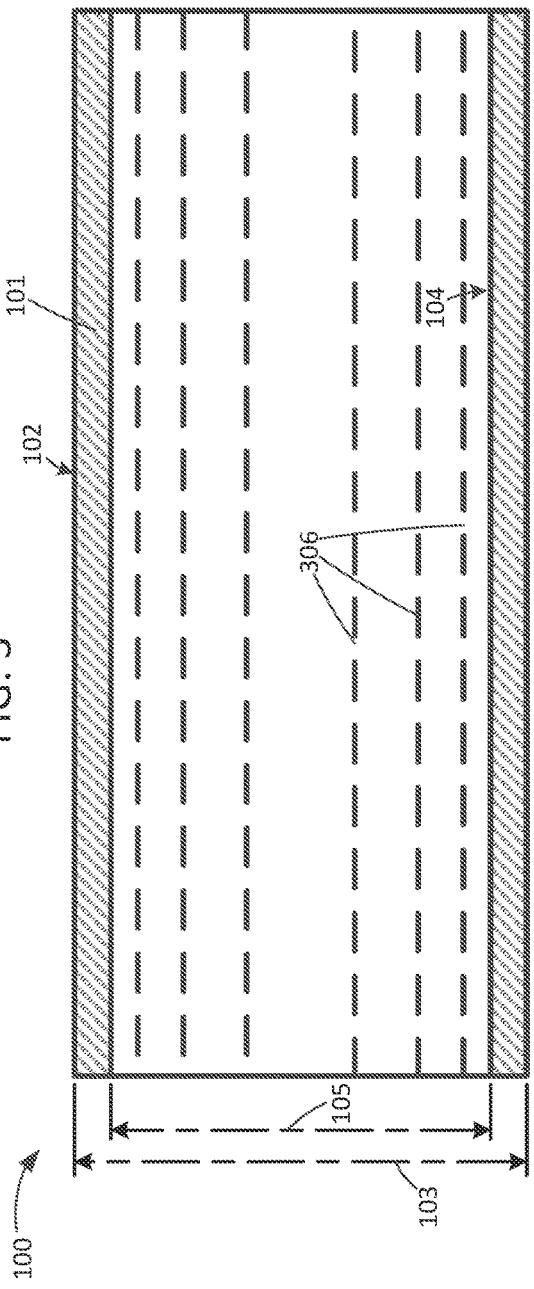

RIBBED EXTRUDED ELECTRICAL CONDUIT

CROSS-REFERENCE TO RELATED APPLICATIONS

This application is a continuation of U.S. application Ser. No. 16/862,012, filed Apr. 29, 2020, which claims priority to U.S. Provisional Application No. 62/842,823, filed May 3, 2019, the disclosure of which is incorporated by reference herein.

TECHNICAL FIELD

The present disclosure relates generally to the field of electrical conduit.

BACKGROUND

Electrical conduit may generally be a tube used to protect and route electrical wiring in a building or structure, and may be constructed from various materials such as metal, plastic, fiber, ceramic, clay, etc. Conduit may be installed in the field by electricians or other workers. Large construction projects may involve many lengths of conduit that need to be transported around the construction site and manipulated to be placed into their proper location. Once the conduit is in place, electrical, fiber optic, or other wiring may be installed, which may involve inserting the wiring into the conduit and pulling the wiring through varying lengths of conduit. Often, longer lengths of conduit with one or more bends may require large amounts of force to pull wiring through the conduit.

SUMMARY

In an embodiment, the disclosure describes an extruded aluminum conduit comprising a substantially cylindrical body including defining a conduit interior. The body may include an exterior surface defined by an outer diameter and an interior surface defined by an inner diameter. The conduit may include one or more protrusions protruding from the interior surface of the body toward the conduit interior and away from the exterior surface. The one or more protrusions may run substantially continuously from a first end of the body to a second end of the body.

In another embodiment, the disclosure describes an extruded aluminum conduit comprising a substantially cylindrical body defining a conduit interior. The body may include an exterior surface defined by an outer diameter and an interior surface. The conduit may include a plurality of protrusions formed on the interior surface, each protrusion extending toward the conduit interior and away from the exterior surface and having a protrusion radius of curvature that is convex with respect to the conduit interior. The conduit may include a plurality of depressions formed into the interior surface, each depression being disposed between two adjacent protrusions of the plurality of protrusions and having a depression radius of curvature that is concave with respect to the conduit interior. The plurality of protrusions and plurality of depressions may each run substantially continuously from a first end of the cylindrical body to a second end of the cylindrical body. Each protrusion may have substantially the same protrusion radius of curvature and each depression has substantially the same depression radius of curvature, and the depression radius of curvature may be at least double the protrusion radius of curvature.

In another embodiment, the disclosure describes an extruded aluminum conduit comprising a substantially cylindrical body defining a conduit interior. The body may include an exterior surface defined by an outer diameter and an interior surface. The conduit may include a plurality of protrusions formed on the interior surface, each protrusion extending toward the conduit interior and away from the exterior surface and having a protrusion radius of curvature that is convex with respect to the conduit interior. The conduit may also include a plurality of depressions formed into the interior surface, each depression being disposed between two adjacent protrusions of the plurality of protrusions and having a depression radius of curvature that is concave with respect to the conduit interior. The plurality of protrusions and plurality of depressions may each run substantially continuously from a first end of the cylindrical body to a second end of the cylindrical body.

BRIEF DESCRIPTION OF THE DRAWINGS

Non-limiting and non-exhaustive embodiments are described in reference to the following drawings. In the drawings, like reference numerals refer to like parts through all the various figures unless otherwise specified.

For a better understanding of the present disclosure, a reference will be made to the following detailed description, which is to be read in association with the accompanying drawings, wherein:

FIG. 3 is a longitudinal cross sectional view of the conduit of FIG. 1 as indicated in FIG. 1;

FIG. 4 is a longitudinal cross sectional view of another embodiment of the conduit of FIG. 1;

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, although it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and includes plural references. The meaning of "in" includes "in" and "on."

Figure 6:
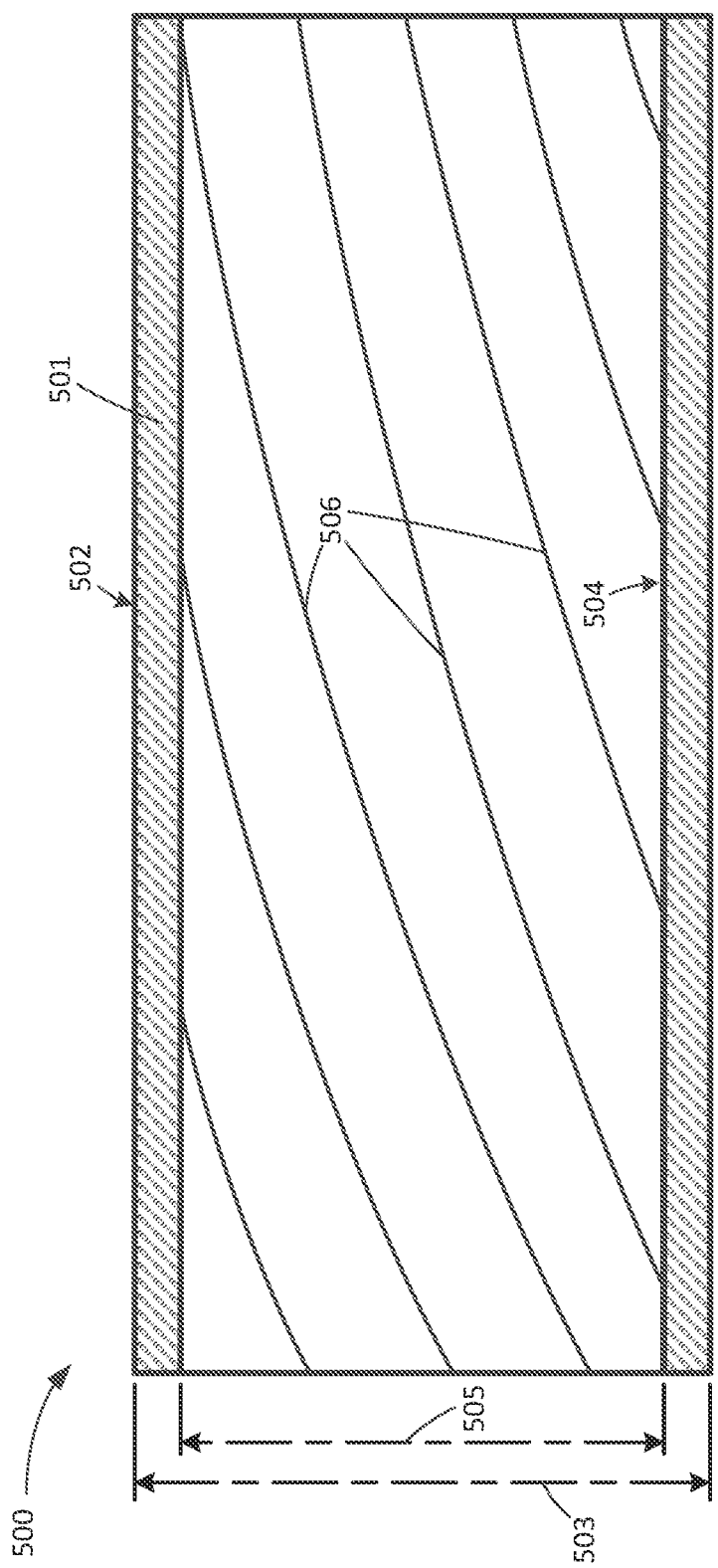
FIG. 6 is a longitudinal cross-sectional view of another embodiment of a conduit in accordance with the disclosure.

The present disclosure relates to electrical conduit and, more specifically, electrical metallic conduit (EMT) having an inner surface that may include ribs, nodules, ridges, or other protruding features. In some embodiments, the EMT conduit may be made from extruded aluminum. The EMT conduit may be substantially cylindrical, having an exterior surface defined by an outer diameter, and an interior surface defined by an inner diameter, and protrusions formed on the interior surface protruding inward away from the exterior surface. In some embodiments, the protrusions may be continuous and run in a substantially straight line along substantially the entire length of the conduit. In other embodiments, the protrusions may not run parallel to the length of the conduit; for example, the protrusions may be spiraled so as to have a rifling configuration, such as shown in FIG. 6. In some embodiments, the protrusions may be incremental along the length of the conduit such that the protrusions may not be continuous along the entire length of the conduit. Differing embodiments of the conduit may have differing numbers of protrusions and may have differing protrusion widths and heights. In some embodiments, all the protrusions may have consistent dimensions, while in other embodiments, the dimensions of the protrusions may vary around the circumference or length of the interior surface. In some embodiments, the conduit may be substantially straight, while in other embodiments, the conduit may include one or more bends, corners, and/or curves.

The EMT conduit described herein may provide various benefits. For example, in some embodiments, the conduit may be made from aluminum, which may be relatively light weight as compared to other conduit materials, such as steel. Conduit with a lighter weight material may generally be easier and require fewer resources and personnel to install than conduit made from other materials. Further, the protrusions on the interior surface of the conduit may allow for wiring to be pulled through the interior of the conduit using relatively less force than with conduit that does not include protrusions. Extruded aluminum EMT conduit that includes protrusions as described herein may provide relatively lightweight conduit that allows wiring to be pulled through the conduit with relatively low forces, thereby improving conditions for installation. Thus, relatively lightweight EMT conduit with interior surface protrusions as described herein may allow enable faster, more efficient EMT installation using less installation personnel and fewer resources.

Figure 1:
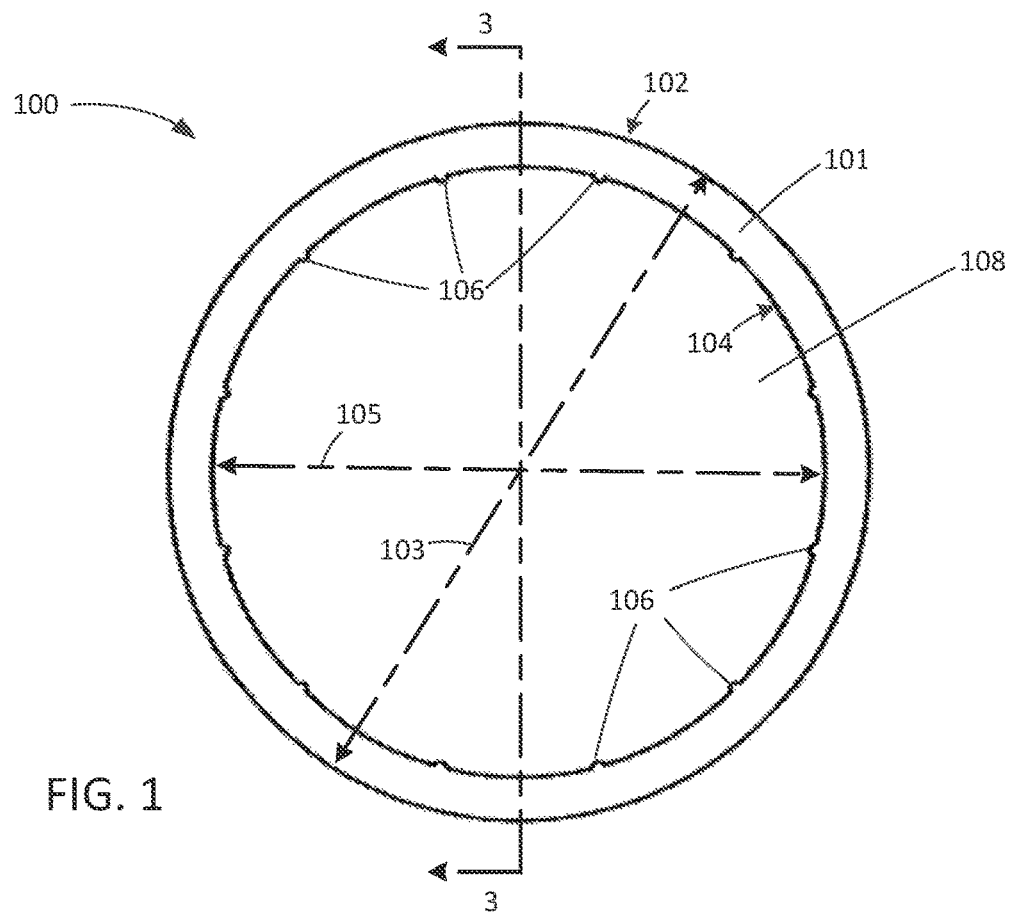
FIG. 1 is cross-sectional view of an embodiment of a conduit in accordance with the disclosure.

FIG. 1 shows a cross-sectional view of a conduit 100 with protrusions as described herein. The conduit 100 may include an elongate, substantially cylindrical body 101 having an exterior surface 102 and an interior surface 104. The conduit 100 may include a first end 110 and a second end 112 (FIG. 3). The exterior surface 102 may be defined by an outer diameter 103 and the interior surface 104 may be defined by an inner diameter 105. The inner and outer diameters 105, 103 may be any of a variety of dimensions as would be familiar to those skilled in the art. In some embodiments, the outer diameter 103 may be anywhere between about 0.25 inch and 5 inches, including but not limited to about 0.5 inch, 0.75 inch, 1.0 inch, 1.25 inches, 1.5 inches, 2.0 inches, 2.5 inches, 3 inches, 3.5 inches, 4 inches, and 4.5 inches. However, those skilled in the art will recognized that conduit with other outer diameters may be used consistent with the disclosure. The interior surface 104 may include one or more protrusions 106 or ribs extending inward into the interior 108 of the body 101 and away from the exterior surface 102. The protrusions 106 may have any of a variety of shapes or profiles. For example, the protrusions 106 may be rounded with a radius of curvature of anywhere between about $1/1000$ inch to about $3/4$ inch, or more in some embodiments. In some embodiments, the protrusions 106 may have a radius of curvature of about $15/1000$ inch, $1/20$ inch, $1/100$ inch, $1/10$ inch, $1/5$ inch, $1/2$ inch, etc. Although the conduit 100 of FIG. 1 shows twelve protrusions, those skilled in the art would understand that substantially any suitable number of protrusions may be used. In other embodiments, the protrusions may be pointed (such as with a substantially v-shaped cross-section), flat (such as with a square or rectangular cross-section), or substantially any other suitable cross-section.

FIG. 3 shows a longitudinal cross-section of the conduit 100 of FIG. 1, including one or more continuous protrusions running substantially the entire longitudinal length of the conduit. In some embodiments, one or more of the protrusions 106 may not run the entire length of the conduit 100. For example, in some embodiments, every other protrusion may only run a first have of the conduit 100, and the remaining protrusions may run only the second half of the conduit. In some embodiments, the one or more protrusions may be evenly spaced around the circumference of the interior surface 104, but in other embodiments, the spacing of the protrusions may be irregular or follow different patterns.

FIG. 4 shows a longitudinal cross-section of the conduit 100 as indicated in FIG. 1, but with one or more sets of protrusions 306 that may run in rows intermittently along substantially the entire length of the conduit 100. In some embodiments, the sets of protrusions 306 may each include uniformly spaced protrusions having uniform or varying sizes an uniform or varying spaces between each adjacent protrusion. While the embodiment in FIG. 3 shows substantially continuous sets of protrusions 306 running substantially the entire length of the conduit 100, it is contemplated that, in some embodiments, some or all of the individual sets of protrusions 306 may not run the entire length of the conduit 100. For example, a first set of protrusions may run only a first half of the longitudinal length of the conduit 100, while a second set of protrusions may run only a second half of the longitudinal length of the conduit. Those skilled in the art will appreciate many suitable variations on such embodiments that would fall within the scope of the disclosure.

Figure 2:
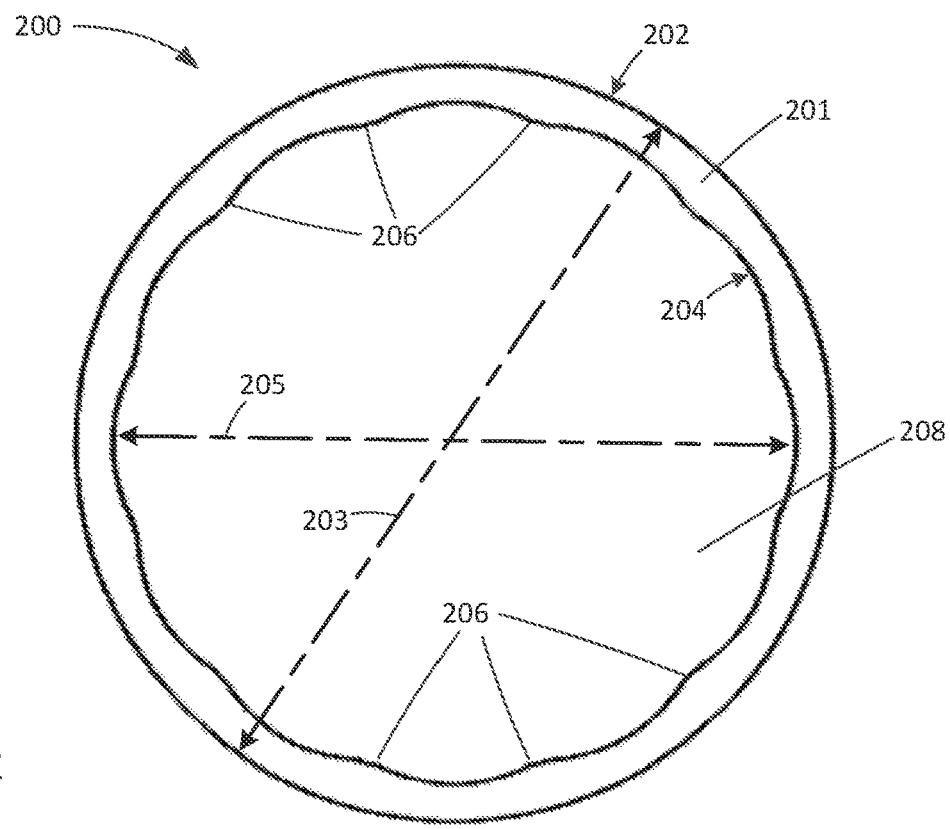
FIG. 2 is a cross-sectional view of another embodiment of a conduit in accordance with the disclosure.

FIG. 2 shows a cross-sectional view of another embodiment of a conduit 200 with protrusions as described herein. The conduit 200 may include an elongate, substantially cylindrical body 201 having an exterior surface 202 and an interior surface 204. The exterior surface 202 may be defined by an outer diameter 203 and the interior surface 204 may be defined by an inner diameter 205. The interior surface 204 may include one or more protrusions 206 or ribs extending inward into the interior 208 of the body 201 and away from the exterior surface 202. As compared to the protrusions 106 of the conduit 100, the protrusions 206 of the conduit 200 have a relatively large radius of curvature and a substantially smooth cross-sectional profile. In some embodiments, the protrusions 206 may smoothly cross over into a rounded interior surface 204. In some embodiments, the protrusions 206 may have a convex shape and the areas between adjacent protrusions may have a concave shape. In some embodiments, the interior surface 204 between adjacent protrusions 206 may be flat, i.e., follow a contour consistent with the inner diameter 205. In some embodiments, the interior surface 204 between adjacent protrusions 206 may be concave and have a radius of curvature that may be lower than that of the interior surface 204, or that is lower than that of the inner diameter 205. As with FIG. 1, substantially any practical number of protrusions 206 may be contemplated, even though FIG. 2 shows twelve protrusions. Additionally, any suitable radius of curvature for the protrusions 206 may be contemplated, as well as spacing, uniformity or non-uniformity of distributions around the interior surface 204, etc.

Figure 5:
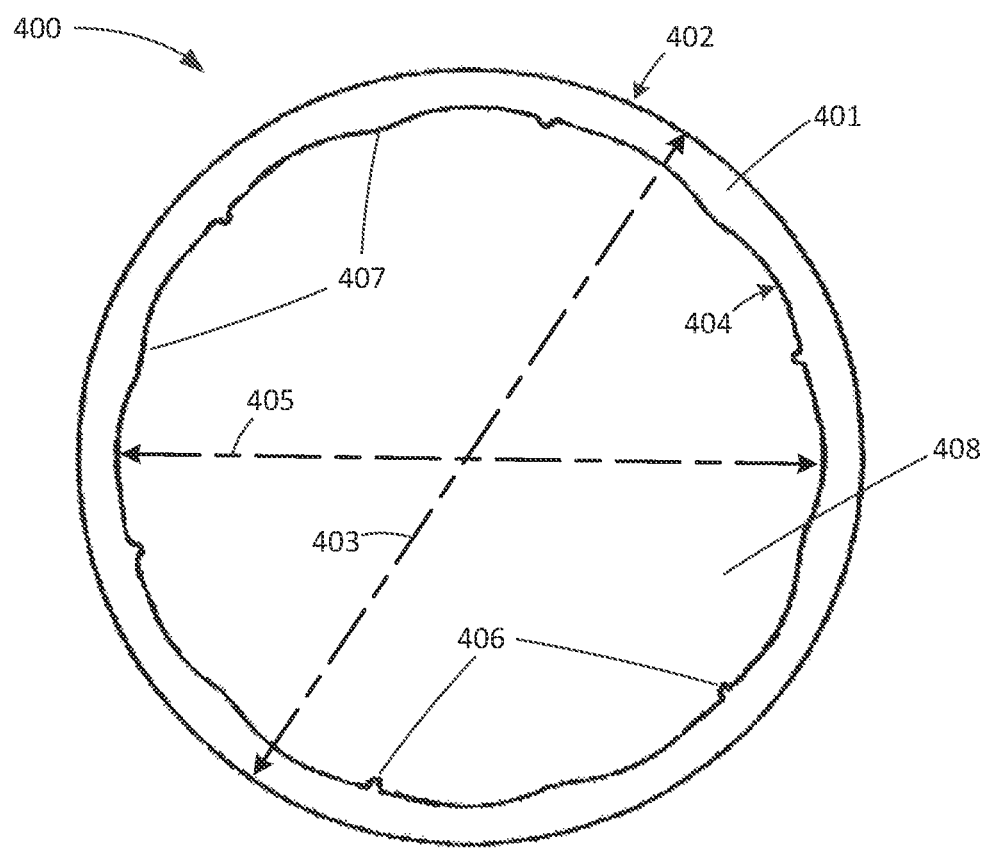
FIG. 5 is a cross-sectional view of another embodiment of a conduit in accordance with the disclosure.

FIG. 5 shows a cross-sectional view of another embodiment of a conduit 400 with protrusions having varying profiles, as described herein. The conduit 400 may include an elongate, substantially cylindrical body 401 having an exterior surface 402 and an interior surface 404. The exterior surface 402 may be defined by an outer diameter 403 and the interior surface 404 may be defined by an inner diameter 405. The interior surface 404 may include one or more first protrusions 406 or ribs and one or more second protrusions 407 extending inward into the interior 408 of the body 401 and away from the exterior surface 402. In some embodiments, the one or more first protrusions 406 may have a relatively small radius of curvature as compared to the one or more second protrusions 407. In some embodiments, the first protrusions 406 may be rounded, squared-off, pointed, or any of a variety of suitable profiles. In some embodiments, the one or more second protrusions 407 may have a relatively large radius of curvature as compared to the first protrusions 406. In some embodiments, the second protrusions 407 may be smoothly rounded, or may be defined by other suitable profiles. In some embodiments, and as shown in FIG. 5, the first and second protrusions 406, 407 may be disposed around the circumference of the interior surface in an alternating pattern. However, those skilled in the art will understand that other patterns may be used in other embodiments. Additionally, those skilled in the art will recognize that the first and second protrusions 406, 407 may run continuously along the entire longitudinal length of the conduit 400, or may have alternative patterns such as described herein related to other embodiments.

FIG. 6 illustrates a longitudinal cross-section of another embodiment of a conduit 500 having protrusions in a rifled pattern. The conduit 500 may include an elongate, substantially cylindrical body 501 having an exterior surface 502 and an interior surface 504. The exterior surface 502 may be defined by an outer diameter 503 and the interior surface 504 may be defined by an inner diameter 505. The interior surface 504 may include one or more protrusions 506 or ribs extending inward into the interior 508 of the body 501 and away from the exterior surface 502. The protrusions 506 may have run along the longitudinal length of the conduit 500 in a direction that is not parallel to the longitudinal directly of the conduit itself. In other words, the protrusions 506 may run in a spiral pattern around the interior surface 504 of the conduit 500. The protrusions 506 may be shaped as any of the other protrusions described herein with reference to other embodiments. The protrusions 506 may be continuous along the length of the conduit, or may be intermittent, as described herein related to other embodiments.

Figure 7:
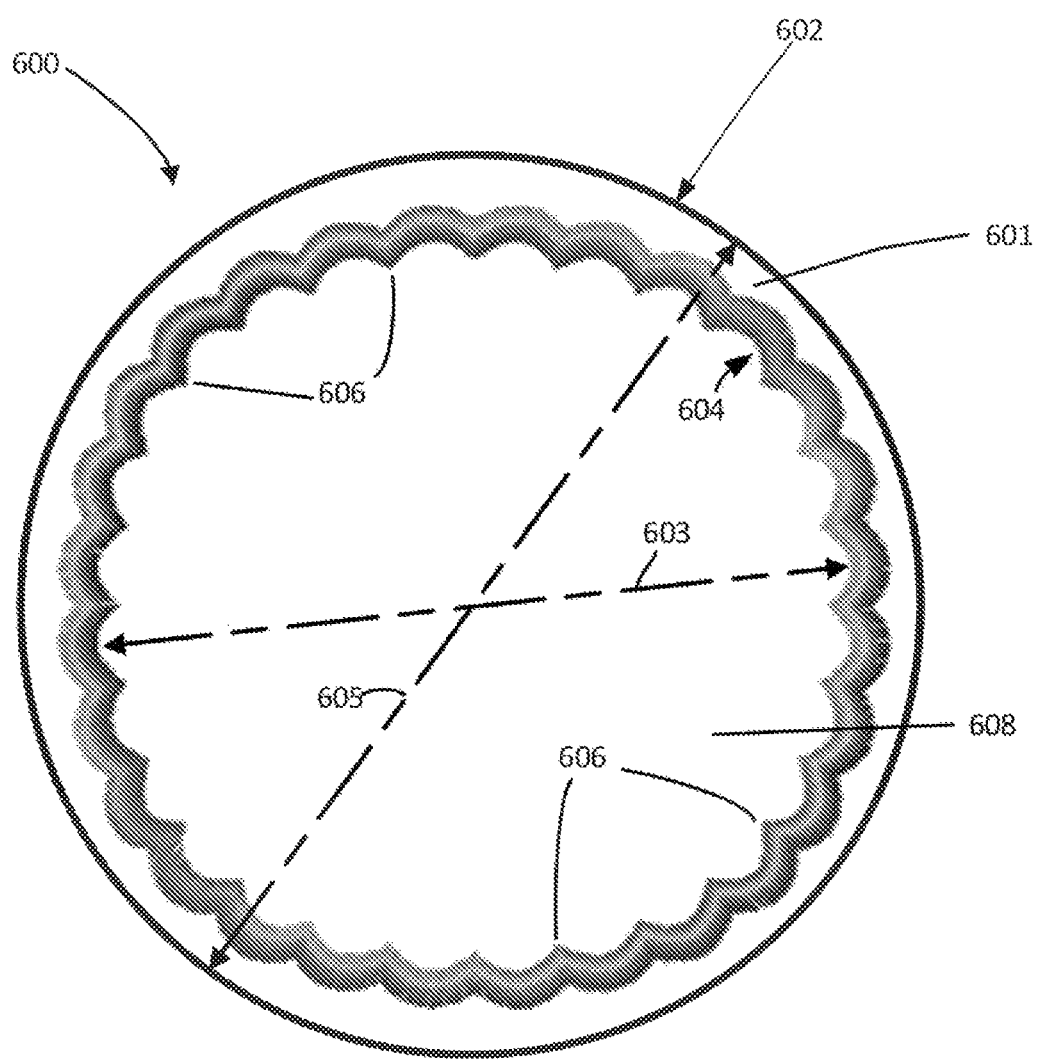
FIG. 7 is a cross-sectional view of another embodiment of a conduit in accordance with the disclosure.

FIG. 7 shows a cross-sectional view of another embodiment of a conduit 600 with protrusions having varying profiles, as described herein. The conduit 600 may include an elongate, substantially cylindrical body 601 having an exterior surface 602 and an interior surface 604. The exterior surface 602 may be defined by an outer diameter 605 and the interior surface 604 may be defined by an inner diameter 603. The interior surface 604 may include one or more protrusions 606 or ribs extending inward into the interior 608 of the body 601 and away from the exterior surface 602. In some embodiments, the one or more protrusions 606 may have a relatively small radius of curvature as compared to the radius of curvature of the interior surface 604 between adjacent protrusions 606. In some embodiments, the radius of curvature of at each of the one or more protrusions 606 may be about 0.020 inches, or in a range between about 0.010 inches and about 0.030 inches, or in a range between about 0.015 inches and about 0.025 inches. In some embodiments, the protrusions 606 may be rounded, squared-off, pointed, or any of a variety of suitable profiles. In some embodiments, and as shown in FIG. 7, the protrusions 606 may be disposed around the circumference of the interior surface in a uniform pattern with substantially equal spacing between each protrusion. However, those skilled in the art will understand that other patterns may be used in other embodiments. Additionally, those skilled in the art will recognize that the protrusions 606 may run continuously along the entire longitudinal length of the conduit 600, or may have alternative patterns such as described herein related to other embodiments.

Figure 8:
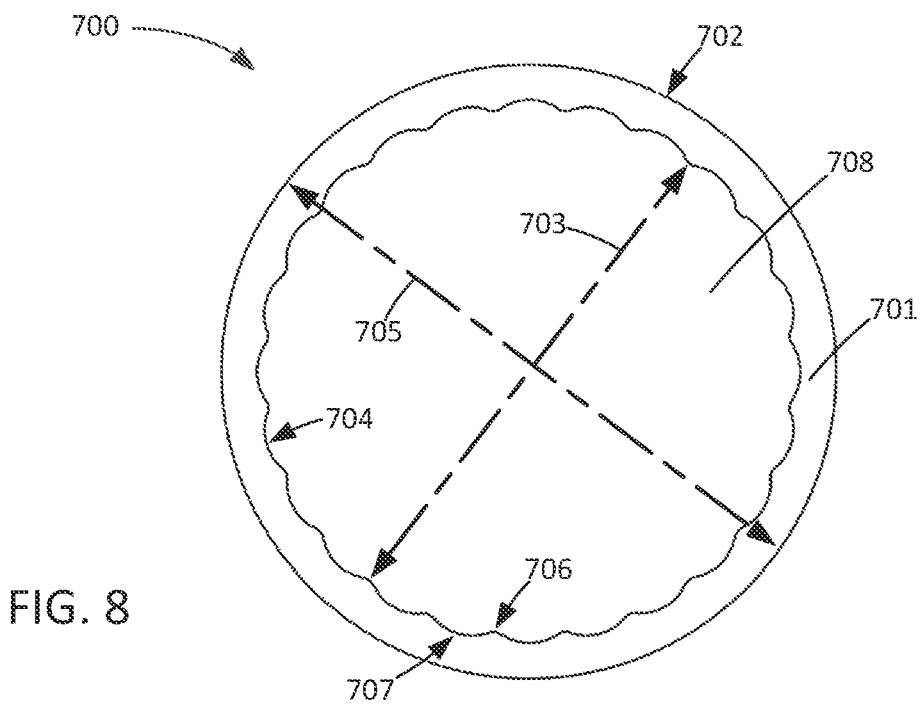
FIG. 8 is a cross-sectional view of another embodiment of a conduit in accordance with the disclosure.

FIG. 8 shows a cross-sectional view of another embodiment of a conduit 700 with protrusions having substantially rounded profiles. The conduit 700 may include an elongate, substantially cylindrical body 701 having an exterior surface 702 and an interior surface 704. The exterior surface 702 may be defined by an outer diameter 705, and the interior surface 704 may be defined by an inner diameter 703. The interior surface 704 may include one or more protrusions 706 or ribs extending inward into the interior 708 of the body 701 and away from the exterior surface 702. The interior surface may also include one or more depressions 707 that may be disposed between adjacent protrusions 706. The depressions 707 may be rounded, flat, concave, or various other suitable shapes. In some embodiments, the one or more protrusions 706 may have a relatively small radius of curvature as compared to the radius of curvature of the depressions 707 between adjacent protrusions. In some embodiments, the radius of curvature of the protrusions 706 and/or the depressions 707 may be consistent around the entire circumference of the interior surface, or may be variable in other embodiments.

In some embodiments, the outer diameter 705 of the conduit 700 may be about 0.922 inch, or about 0.9 inch, or about 1 inch. In some embodiments, the outer diameter 705 may be between about 0.9 inch and about 1.0 inch, or about 0.85 inch to about 1.05 inches, or about 0.917 inch and about 0.927 inch. In some embodiments, the conduit 700 may have an inner diameter 703 of about 0.790 inch, or in a range between about 0.75 inch and about 0.80 inch, or about 0.75 inch and about 0.85 inch. In some embodiments, the radius of curvature of each of the one or more protrusions 706 may be about 0.024 inches, or in a range between about 0.010 inch and about 0.030 inch, or in a range between about 0.015 inch and about 0.025 inch, or in a range between about 0.020 inch and about 0.030 inch. In some embodiments, the protrusions 706 may be rounded, squared-off, pointed, or any of a variety of suitable profiles. In some embodiments, the one or more depressions 707 may each have a radius of curvature of about 0.075 inch, or in a range between about 0.070 inch and about 0.080 inch. In some embodiments, the conduit 700 may include about 24 protrusions and depressions, or between about 22 and 26 protrusions and depressions along the interior surface 704. In some embodiments, the conduit 700 may have a minimum thickness measured between the exterior surface 702 and the interior surface 704 of about 0.053 inch, or in a range between about 0.050 inch and about 0.060 inch, or about 0.046 inch and about 0.060 inch. In some embodiments, a ratio between the radius of curvature of each protrusion 706 and each depression 707 may be about 1:3, or between about 1:4 and about 1:2. In some embodiments, a ratio between the outer diameter 705 and the radius of curvature of each protrusion 706 may be about 38.5:1, or between about 38:1 and about 39:1. In some embodiments, a ratio between the outer diameter 705 and the radius of curvature of each depression 707 may be about 12.3:1, or in a range between about 12:1 and about 13:1. In some embodiments, a ratio between the outer diameter 705 (measured in inches) and the number of protrusions and depressions may be about 3.8:100, or in a range between about 3:100 and about 4:100. In some embodiments, and as shown in FIG. 8, the protrusions 706 may be disposed around the circumference of the interior surface in a uniform pattern with substantially equal spacing between each protrusion. However, those skilled in the art will understand that other patterns may be used in other embodiments. Additionally, those skilled in the art will recognize that the protrusions 706 may run continuously along the entire longitudinal length of the conduit 700, or may have alternative patterns such as described herein related to other embodiments.

Figure 9:
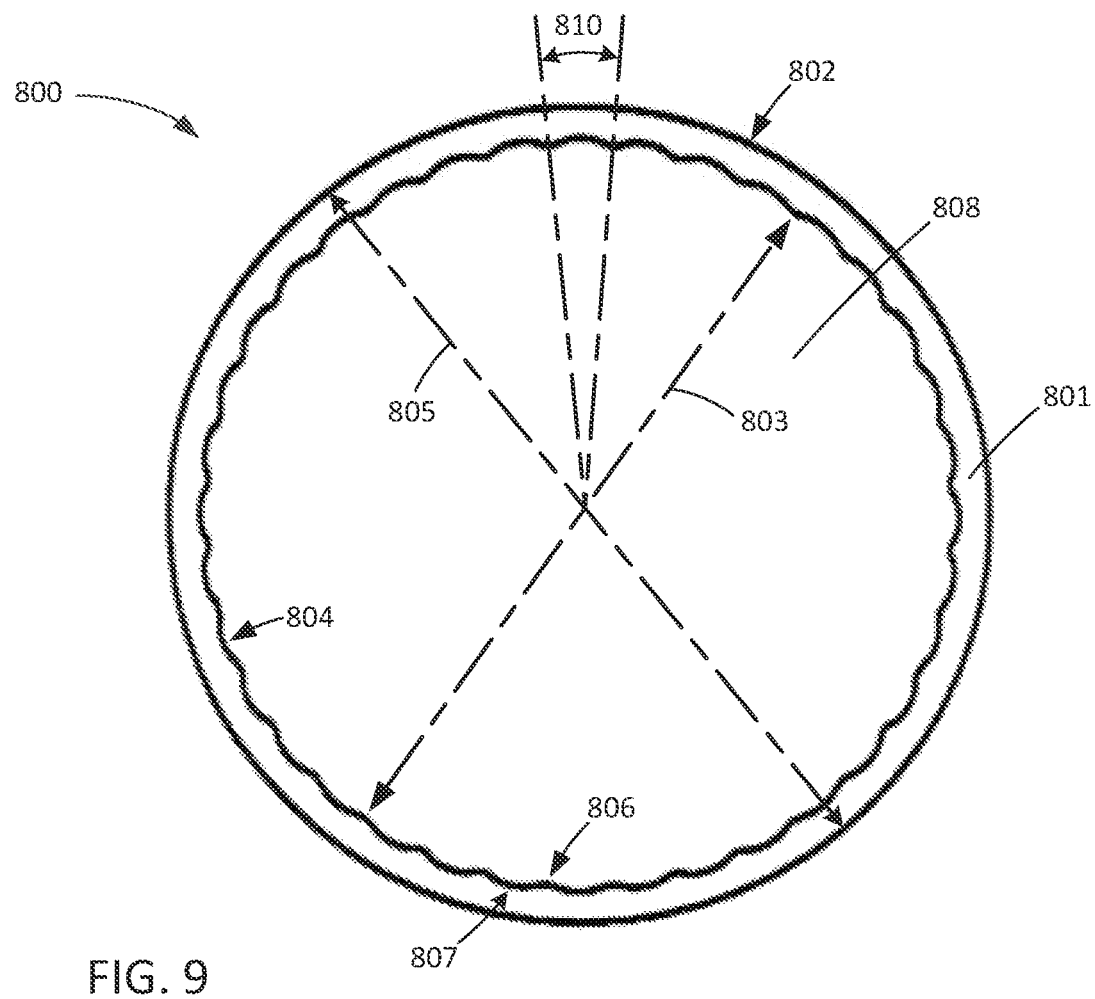
FIG. 9 is a cross-sectional view of another embodiment of a conduit in accordance with the disclosure.

FIG. 9 shows a cross-sectional view of another embodiment of a conduit 800 with protrusions having substantially rounded profiles. The conduit 800 may include an elongate, substantially cylindrical body 801 having an exterior surface 802 and an interior surface 804. The exterior surface 802 may be defined by an outer diameter 805, and the interior surface 804 may be defined by an inner diameter 803. The interior surface 804 may include one or more protrusions 806 or ribs extending inward into the interior 808 of the body 801 and away from the exterior surface 802. The interior surface may also include one or more depressions 807 that may be disposed between adjacent protrusions 806. The depressions 807 may be rounded, flat, concave, or various other suitable shapes. In some embodiments, the one or more protrusions 806 may have a relatively small radius of curvature as compared to the radius of curvature of the depressions 807 between adjacent protrusions. In some embodiments, the radius of curvature of the protrusions 806 and/or the depressions 807 may be consistent around the entire circumference of the interior surface, or may be variable in other embodiments.

In some embodiments, the outer diameter 805 of the conduit 800 may be about 1.51 inches, or about 1.5 inches, or about 1.6 inches. In some embodiments, the outer diameter 805 may be between about 1.5 inches and about 1.6 inches, or about 1.45 inches to about 1.65 inches, or about 1.4 inches and about 1.7 inches. In some embodiments, the conduit 800 may have an inner diameter 803 of about 1.369 inches, or in a range between about 1.36 inches and about 1.37 inches, or about 1.3 inches and about 1.4 inches. In some embodiments, the radius of curvature of each of the one or more protrusions 806 may be about 0.043 inch, or in a range between about 0.040 inch and about 0.050 inch, or in a range between about 0.035 inch and about 0.055 inch, or in a range between about 0.030 inch and about 0.060 inch. In some embodiments, the protrusions 806 may be rounded, squared-off, pointed, or any of a variety of suitable profiles. In some embodiments, the one or more depressions 807 may each have a radius of curvature of about 0.098 inch, or in a range between about 0.09 inch and about 1.0 inch. In some embodiments, the conduit 800 may include about 36 protrusions and depressions, or between about 34 and 38 protrusions and depressions along the interior surface 804. In some embodiments, the conduit 800 may have a minimum thickness measured between the exterior surface 802 and the interior surface 804 of about 0.058 inch, or in a range between about 0.050 inch and about 0.060 inch, or about 0.045 inch and about 0.065 inch. In some embodiments, a ratio between the radius of curvature of each protrusion 806 and each depression 807 may be about 1:2.3, or between about 1:3 and about 2:3, or between about 3:7 and about 4:7. In some embodiments, a ratio between the outer diameter 805 and the radius of curvature of each protrusion 806 may be about 35.1:1, or between about 35:1 and about 36:1, or between about 34:1 and about 37:1. In some embodiments, a ratio between the outer diameter 805 and the radius of curvature of each depression 807 may be about 15.4:1, or in a range between about 15:1 and about 16:1, or between about 13.5:1 and about 16.5:1. In some embodiments, a ratio between the outer diameter 805 (measured in inches) and the number of protrusions and depressions may be about 4.2:100, or in a range between about 4:100 and about 5:100. In some embodiments, a protrusion angle 810 may be about 10 degrees, or about 9.5 degrees and 10.5 degrees in other embodiments, or between about 9 degrees and about 11 degrees in other embodiments. The protrusion angle 810 may be measured between a first radial line drawn from a center of the cylindrical conduit 800 through an apex of a first protrusion and a second radial line between the center of the cylindrical conduit through an apex of a second protrusion adjacent the first protrusion. In some embodiments, and as shown in FIG. 9, the protrusions 806 may be disposed around the circumference of the interior surface in a uniform pattern with substantially equal spacing between each protrusion. However, those skilled in the art will understand that other patterns may be used in other embodiments. Additionally, those skilled in the art will recognize that the protrusions 806 may run continuously along the entire longitudinal length of the conduit 800, or may have alternative patterns such as described herein related to other embodiments.

Figure 10:
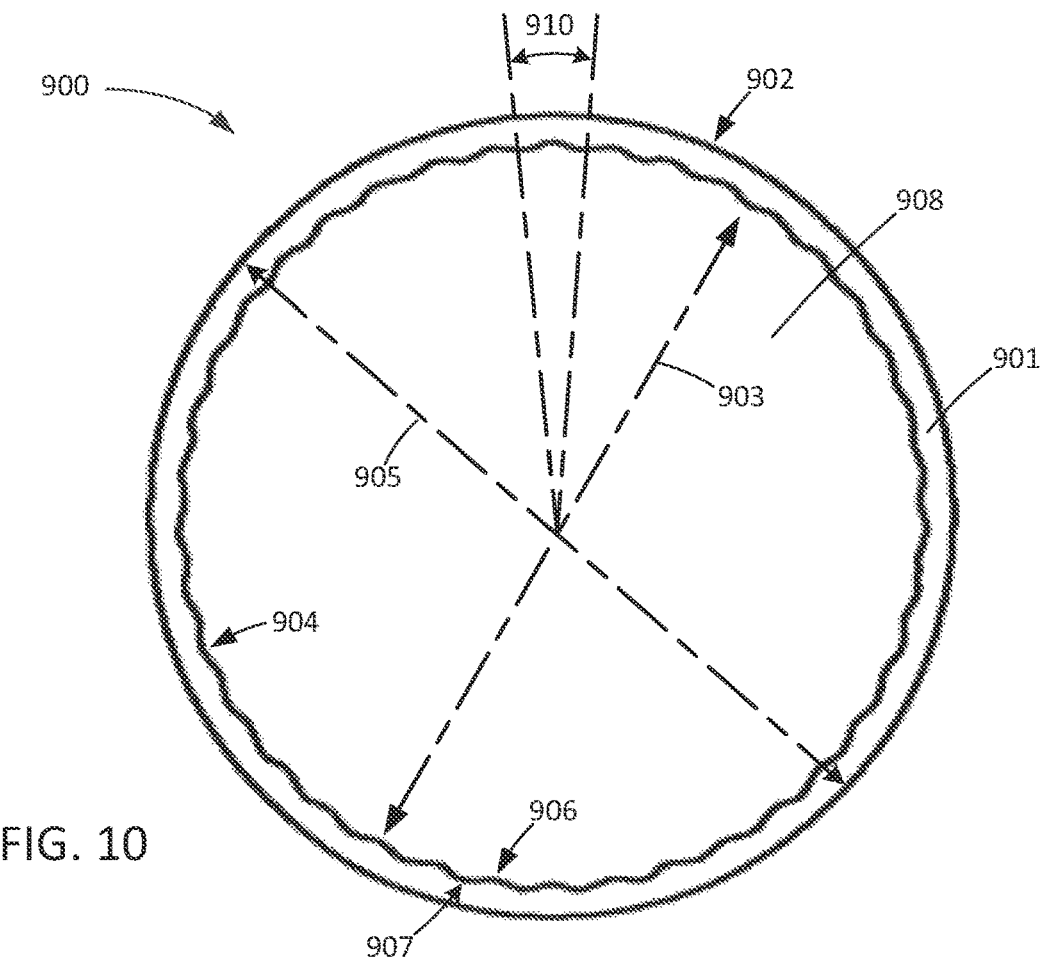
FIG. 10 is a cross-sectional view of another embodiment of a conduit in accordance with the disclosure.

FIG. 10 shows a cross-sectional view of another embodiment of a conduit 900 with protrusions having substantially rounded profiles. The conduit 900 may include an elongate, substantially cylindrical body 901 having an exterior surface 902 and an interior surface 904. The exterior surface 902 may be defined by an outer diameter 905, and the interior surface 904 may be defined by an inner diameter 903. The interior surface 904 may include one or more protrusions 906 or ribs extending inward into the interior 908 of the body 901 and away from the exterior surface 902. The interior surface may also include one or more depressions 907 that may be disposed between adjacent protrusions 906. The depressions 907 may be rounded, flat, concave, or various other suitable shapes. In some embodiments, the one or more protrusions 906 may have a relatively small radius of curvature as compared to the radius of curvature of the depressions 907 between adjacent protrusions. In some embodiments, the radius of curvature of the protrusions 906 and/or the depressions 907 may be consistent around the entire circumference of the interior surface, or may be variable in other embodiments.

In some embodiments, the outer diameter 905 of the conduit 900 may be about 1.74 inches, or about 1.7 inches, or about 1.8 inches. In some embodiments, the outer diameter 905 may be between about 1.7 inches and about 1.8 inches, or about 1.65 inches to about 1.85 inches, or about 1.60 inches and about 1.90 inches. In some embodiments, the conduit 900 may have an inner diameter 903 of about 1.59 inches, or in a range between about 1.5 inches and about 1.6 inches, or about 1.45 inches and about 1.65 inches. In some embodiments, the radius of curvature of each of the one or more protrusions 906 may be about 0.073 inches, or in a range between about 0.070 inch and about 0.080 inch, or in a range between about 0.065 inch and about 0.085 inch, or in a range between about 0.06 inch and about 0.09 inch. In some embodiments, the protrusions 906 may be rounded, squared-off, pointed, or any of a variety of suitable profiles. In some embodiments, the one or more depressions 907 may each have a radius of curvature of about 0.073 inch, or in a range between about 0.070 inch and about 0.080 inch, or between about 0.06 inch and about 0.09 inch. In some embodiments, the conduit 900 may include about 39 protrusions and depressions, or between about 37 and 41 protrusions and depressions along the interior surface 904. In some embodiments, the conduit 900 may have a minimum thickness measured between the exterior surface 902 and the interior surface 904 of about 0.060 inch, or in a range between about 0.055 inch and about 0.065 inch, or about 0.05 inch and about 0.07 inch. In some embodiments, a ratio between the radius of curvature of each protrusion 906 and each depression 907 may be about 1:1, or between about 1:0.5 and about 1:1.5. In some embodiments, a ratio between the outer diameter 905 and the radius of curvature of each protrusion 906 may be about 23.8:1, or between about 23:1 and about 24:1. In some embodiments, a ratio between the outer diameter 905 and the radius of curvature of each depression 907 may be about 23.8:1, or between about 23:1 and about 24:1. In some embodiments, a ratio between the outer diameter 905 (measured in inches) and the number of protrusions and depressions may be about 4.5:100, or in a range between about 4:100 and about 5:100. In some embodiments, a protrusion angle 910 may be about 9.23 degrees, or about 9.0 degrees and 9.5 degrees in other embodiments, or between about 8.5 degrees and about 10 degrees in other embodiments. The protrusion angle 910 may be measured between a first radial line drawn from a center of the cylindrical conduit 800 through an apex of a first protrusion and a second radial line between the center of the cylindrical conduit through an apex of a second protrusion adjacent the first protrusion. In some embodiments, and as shown in FIG. 10, the protrusions 906 may be disposed around the circumference of the interior surface in a uniform pattern with substantially equal spacing between each protrusion. However, those skilled in the art will understand that other patterns may be used in other embodiments. Additionally, those skilled in the art will recognize that the protrusions 906 may run continuously along the entire longitudinal length of the conduit 900, or may have alternative patterns such as described herein related to other embodiments.

Figure 11:
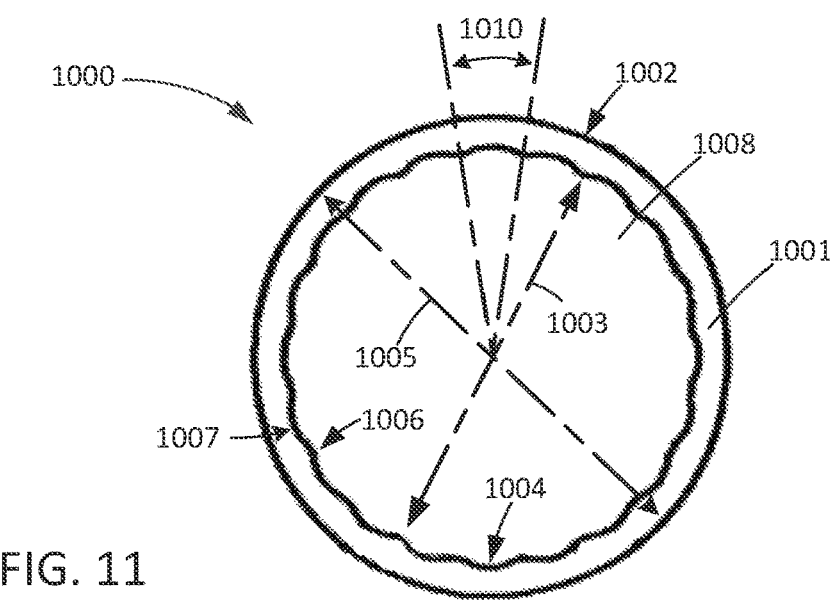
FIG. 11 is a cross-sectional view of another embodiment of a conduit in accordance with the disclosure.

FIG. 11 shows a cross-sectional view of another embodiment of a conduit 1000 with protrusions having substantially rounded profiles. The conduit 1000 may include an elongate, substantially cylindrical body 1001 having an exterior surface 1002 and an interior surface 1004. The exterior surface 1002 may be defined by an outer diameter 1005, and the interior surface 1004 may be defined by an inner diameter 1003. The interior surface 1004 may include one or more protrusions 1006 or ribs extending inward into the interior 1008 of the body 1001 and away from the exterior surface 1002. The interior surface may also include one or more depressions 1007 that may be disposed between adjacent protrusions 1006. The depressions 1007 may be rounded, flat, concave, or various other suitable shapes. In some embodiments, the one or more protrusions 1006 may have a relatively small radius of curvature as compared to the radius of curvature of the depressions 1007 between adjacent protrusions. In some embodiments, the radius of curvature of the protrusions 1006 and/or the depressions 1007 may be consistent around the entire circumference of the interior surface, or may be variable in other embodiments.

In some embodiments, the outer diameter 1005 of the conduit 1000 may be about 0.706 inch, or about 0.7 inch, or about 0.8 inch. In some embodiments, the outer diameter 1005 may be between about 0.7 inch and about 0.8 inch, or about 0.65 inch to about 0.75 inch, or about 0.6 inch and about 0.8 inch. In some embodiments, the conduit 1000 may have an inner diameter 1003 of about 0.6 inch, or in a range between about 0.55 inch and about 0.65 inch, or about 0.5 inch and about 0.7 inch. In some embodiments, the radius of curvature of each of the one or more protrusions 1006 may be about 0.021 inch, or in a range between about 0.02 inch and about 0.03 inch, or in a range between about 0.015 inch and about 0.025 inch, or in a range between about 0.01 inch and about 0.035 inch. In some embodiments, the protrusions 1006 may be rounded, squared-off, pointed, or any of a variety of suitable profiles. In some embodiments, the one or more depressions 1007 may each have a radius of curvature of about 0.07 inch, or in a range between about 0.065 inch and about 0.075 inch. In some embodiments, the conduit 1000 may include about 20 protrusions and depressions, or between about 18 and 22 protrusions and depressions along the interior surface 1004. In some embodiments, the conduit 1000 may have a minimum thickness measured between the exterior surface 1002 and the interior surface 1004 of about 0.042 inch, or in a range between about 0.04 inch and about 0.05 inch, or about 0.035 inch and about 0.055 inch. In some embodiments, a ratio between the radius of curvature of each protrusion 1006 and each depression 1007 may be about 1:3.33, or between about 1:3 and about 1:4. In some embodiments, a ratio between the outer diameter 1005 and the radius of curvature of each protrusion 1006 may be about 33.6:1, or between about 33:1 and about 34:1, or between about 30:1 and about 35:1. In some embodiments, a ratio between the outer diameter 1005 and the radius of curvature of each depression 1007 may be about 10.1:1, or in a range between about 10:1 and about 11:1. In some embodiments, a ratio between the outer diameter 1005 (measured in inches) and the number of protrusions and depressions may be about 3.5:100, or in a range between about 3:100 and about 4:100. In some embodiments, a protrusion angle 810 may be about 18 degrees, or about 17 degrees and 19 degrees in other embodiments, or between about 16 degrees and about 20 degrees in other embodiments. The protrusion angle 810 may be measured between a first radial line drawn from a center of the cylindrical conduit 800 through an apex of a first protrusion and a second radial line between the center of the cylindrical conduit through an apex of a second protrusion adjacent the first protrusion. In some embodiments, and as shown in FIG. 11, the protrusions 1006 may be disposed around the circumference of the interior surface in a uniform pattern with substantially equal spacing between each protrusion. However, those skilled in the art will understand that other patterns and other dimensions may be used in other embodiments. Additionally, those skilled in the art will recognize that the protrusions 1006 may run continuously along the entire longitudinal length of the conduit 1000, or may have alternative patterns such as described herein related to other embodiments.

In another embodiment, the outer diameter of the conduit may be about 1.163 inches, or about 1.15 inches, or about 1.2 inches. In some embodiments, the outer diameter may be between about 1.1 inches and about 1.2 inches, or about 1.16 inches and about 1.7 inches, or about 1.155 inches and about 1.170 inches. In some embodiments, the conduit may have an inner diameter of about 1.015 inches, or about 1.0 inch, or in a range between about 0.95 inch and about 1.05 inches, or about 0.9 inch and about 1.1 inches. In some embodiments, the radius of curvature of each of the one or more protrusions may be about 0.025 inch, or in a range between about 0.02 inch and about 0.03 inch, or in a range between about 0.015 inch and about 0.35 inch, or in a range between about 0.01 inch and about 0.04 inch. In some embodiments, the protrusions may be rounded, squared-off, pointed, or any of a variety of suitable profiles. In some embodiments, the one or more depressions may each have a radius of curvature of about 0.063 inch, or in a range between about 0.06 inch and about 0.07 inch, or in a range between about 0.055 inch and about 0.075 inch. In some embodiments, the conduit may include about 30 protrusions and depressions, or between about 28 and 32 protrusions and depressions along the interior surface. In some embodiments, the conduit may have a minimum thickness measured between the exterior surface and the interior surface of about 0.057 inch, or in a range between about 0.05 inch and about 0.06 inch, or about 0.045 inch and about 0.065 inch. In some embodiments, a ratio between the radius of curvature of each protrusion and each depression may be about 1:3, or between about 1:4 and about 1:2. In some embodiments, a ratio between the outer diameter and the radius of curvature of each protrusion may be about 46.5:1, or between about 46:1 and about 47:1, or between about 45:1 and about 50:1. In some embodiments, a ratio between the outer diameter and the radius of curvature of each depression may be about 18.5:1, or in a range between about 18:1 and about 19:1. In some embodiments, a ratio between the outer diameter (measured in inches) and the number of protrusions and depressions may be about 3.9:100, or in a range between about 3:100 and about 4:100.

Examples

Tests of some embodiments of the conduits described herein have been conducted with results compared to other types of existing conduit. For the tests, three types of conduit were compared: (1) extruded aluminum conduit having a 1.0 inch outer diameter and including a ribbed interior surface as described herein, (2) extruded aluminum conduit having a 1.0 inch outer diameter having a traditional non-ribbed interior surface, and (3) steel conduit having a 1.0 inch outer diameter having a traditional non-ribbed interior surface. For each type of conduit tested, the test conduit included four 90 degree bends. For the test, electrical wiring was inserted into each type of conduit, lead through the length of the conduit, and pulled through the conduit in a manner known in the art. The wiring could be lead through the conduit using a steel rod or a string lead. The pull force required to pull the wiring through each type of conduit was then measured. Table 1 below displays the force required to pull wiring through each type of conduit:

TABLE 1

| Conduit Type: | 1" Extruded Aluminum (No Protrusions) Four 90 degree Bends | 1" Steel (No Protrusions) Four 90 degree Bends | 1" Extruded Aluminum (With Protrusions) Four 90 degree Bends |
|---|---|---|---|
| Pull Force | 110-120 pounds | 30-40 pounds | 50-55 pounds |

The 1" Extruded Aluminum Conduit used in the test in Table 1 includes an outer diameter of about 1.163 inches, an inner diameter of about 1.015 inches, a protrusion radius of curvature of about 0.025 inch, a depression radius of curvature of about 0.063 inch, a minimum thickness of about 0.057 inch, a maximum thickness of about 0.074 inch, and 30 protrusions and 30 depressions. The 1" Extruded Aluminum (No Protrusions) and the 1" Steel (No Protrusions) have similar outer diameter and inner diameter dimensions but no protrusions or depressions. Pull force required to pull wiring through conduit may have practical ramifications for installation efficiency speed, efficiency, and installation staffing. For example, more installers would be required in order to pull 110-120 pounds of force to install wiring than would the number of installers to pull 30-40 pounds or even 50-55 pounds. For example, depending on the installer, typically, a pull force of 110 pounds may take three installers, while pulling 41 pounds or 52 pounds may take only two installers. Thus, the non-protrusion steel conduit and the protrusion aluminum conduit may allow for more efficient installation due to the lower pull force.

Further, however, the more lightweight the conduit is, the more efficiently it may be installed. The density of steel may range from between about 7.75 g/cm$^3$ and 8.05 g/cm$^3$, while the density of aluminum is about 2.7 g/cm$^3$, and the density of various aluminum-based alloys may range between about 2.5 g/cm$^3$ and about 2.9 g/cm$^3$. Accordingly, any length of extruded aluminum or aluminum alloy conduit will be substantially lighter weight than similar lengths of steel conduit. On average, lengths of aluminum conduit may be about 65% lighter than similar lengths of steel conduit. Thus, the combined light-weight properties of aluminum conduit over steel conduit and the improved pull-force properties of aluminum conduit with protrusions over aluminum conduit without protrusions may provide surprising advantages to extruded aluminum conduit with protrusions as described herein.

The foregoing description and drawings merely explain and illustrate the invention and the invention is not limited thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. An extruded aluminum conduit comprising:
   an extruded aluminum body including an exterior surface defined by an outer diameter and an interior surface;
   a plurality of protrusions formed on the interior surface and extending away from the exterior surface, each protrusion having an apex defining an inner diameter of the extruded aluminum body; and
   a plurality of depressions formed into the interior surface, each depression being disposed between two adjacent protrusions of the plurality of protrusions,
   wherein the plurality of protrusions and plurality of depressions are substantially parallel to one another and run substantially continuously from a first end of the extruded aluminum body to a second end of the extruded aluminum body, and
   wherein a ratio between the outer diameter and the inner diameter is less than or equal to about 8:5.

2. The extruded aluminum conduit of claim 1, wherein a ratio between a protrusion radius of curvature and a depression radius of curvature is equal to or less than about 1:3.

3. The extruded aluminum conduit of claim 1, wherein a ratio between a protrusion radius of curvature and a depression radius of curvature is greater than or equal to about 1:3 and less than or equal to about 2:3.

4. The extruded aluminum conduit of claim 1, wherein a ratio between a protrusion radius of curvature and a depression radius of curvature is greater than or equal to about 1:4 and less than or equal to about 1:2.

5. The extruded aluminum conduit of claim 1, wherein a protrusion radius of curvature is about 0.025 inch.

6. The extruded aluminum conduit of claim 5, wherein a depression radius of curvature is about 0.063 inch.

7. The extruded aluminum conduit of claim 6, wherein the outer diameter of the cylindrical body is about 1.163 inches.

8. The extruded aluminum conduit of claim 7, wherein the plurality of protrusions is about 30 protrusions, and wherein the plurality of depressions is about 30 depressions.

9. An extruded aluminum conduit comprising:
   an extruded aluminum body defining, the cylindrical body including an exterior surface defined by an outer diameter and an interior surface; and
   a plurality of protrusions formed on the interior surface and extending away from the exterior surface, each protrusion of the plurality of protrusions having an apex defining an inner diameter of the extruded aluminum body,
   wherein the plurality of protrusions are substantially parallel to one another and run substantially continuously from a first end of the extruded aluminum body to a second end of the extruded aluminum body, and
   wherein a ratio between the outer diameter and the inner diameter is no more than about 8:5.

10. The extruded aluminum conduit of claim 9, wherein each protrusion has of the plurality of protrusions have substantially the same protrusion radius of curvature.

11. The extruded aluminum conduit of claim 9, wherein a protrusion radius of curvature of each of the plurality of protrusions is less than a depression radius of curvature of a plurality of depressions formed into the interior surface.

12. The extruded aluminum conduit of claim 11, wherein a ratio between the protrusion radius of curvature and the depression radius of curvature is between about 1:3 and about 1:2.

13. The extruded aluminum conduit of claim 9, wherein a protrusion radius of curvature is between about 0.015 inch and about 0.035 inch.

14. An extruded aluminum conduit comprising:
   an extruded aluminum body, the cylindrical body including an exterior surface defined by an outer diameter and an interior surface; and
   one or more protrusions protruding from the interior surface away from the exterior surface and each having an apex defining an inner diameter of the extruded aluminum body;
   wherein the one or more protrusions run substantially continuously from a first end of the cylindrical body to a second end of the cylindrical body and substantially parallel to a length of the conduit between the first end and the second end, and
   wherein a ratio between the outer diameter and the inner diameter is no more than about 8:5.

15. The extruded aluminum conduit of claim 14, wherein the one or more protrusions are distributed uniformly around a circumference of the interior surface.

16. The extruded aluminum conduit of claim 14, wherein the one or more protrusions are rounded with a radius of curvature of between about 1/1000 inch to about 3/4 inch.

17. The extruded aluminum conduit of claim 14, wherein the one or more protrusions are rounded with a radius of curvature of about 15/1000 inch.

18. The extruded aluminum conduit of claim 14, wherein the one or more protrusions are twenty four protrusions uniformly positioned around a circumference of the interior surface.

19. The extruded aluminum conduit of claim 14 further comprising a first set of protrusions of the one or more protrusions and a second set of protrusions of the one or more protrusions, wherein each protrusion of the first set of protrusions has a radius of curvature that is greater than a radius of curvature of each protrusion of the second set of protrusions.

20. The extruded aluminum conduit of claim 14, wherein the one or more protrusions are substantially parallel to one another.

* * * * *